US006838545B2

(12) United States Patent
Chapman et al.

(10) Patent No.: US 6,838,545 B2
(45) Date of Patent: Jan. 4, 2005

(54) REACTION OF FLUOROPOLYMER MELTS

(75) Inventors: Gregory Allen Chapman, Washington, WV (US); David E. Bidstrup, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 49 days.

(21) Appl. No.: 10/290,642

(22) Filed: Nov. 8, 2002

(65) Prior Publication Data

US 2004/0092669 A1 May 13, 2004

(51) Int. Cl.$^7$ .................................................. C08F 6/00
(52) U.S. Cl. ...................... 528/480; 525/359.1; 526/60
(58) Field of Search ........................ 525/359.1; 526/60; 528/480

(56) References Cited

U.S. PATENT DOCUMENTS

| | | |
|---|---|---|
| 4,626,587 A | 12/1986 | Morgan et al. |
| 5,318,358 A | 6/1994 | Wobbe et al. |
| 5,391,709 A | 2/1995 | Egres, Jr. et al. |
| 5,932,159 A | 8/1999 | Rauwendaal |
| 2002/0111433 A1 * | 8/2002 | Lee et al. ................... 525/200 |

FOREIGN PATENT DOCUMENTS

| | | |
|---|---|---|
| EP | 0178935 A1 | 4/1986 |
| EP | 0457255 A1 | 11/1991 |
| EP | 0780403 A2 | 6/1997 |
| EP | 0928673 A1 | 7/1999 |
| EP | 1070728 A2 | 1/2001 |
| EP | 1170303 A1 | 1/2002 |
| GB | 766840 | 1/1957 |
| GB | 1210794 | 10/1970 |
| WO | WO 00/44797 | 8/2000 |

* cited by examiner

Primary Examiner—Terressa Boykin

(57) ABSTRACT

Chemical reactions are carried out with molten fluoropolymer, most conveniently in an extruder, wherein the reaction zone in the extruder is isolated from the melting zone, and the molten fluoropolymer is subdivided in the reaction zone sufficiently that contact and reaction between the reactant and the molten fluoropolymer in the reaction zone is essentially free of mass transfer limitation, followed by devolatilization in isolation from the reaction zone, and cooling the devolatilized fluoropolymer.

19 Claims, No Drawings

REACTION OF FLUOROPOLYMER MELTS

FIELD OF THE INVENTION

This invention relates to chemical reactions involving melts of melt-processible fluoropolymers, e.g. to reduce unstable polymer endgroups.

BACKGROUND OF THE INVENTION

Directly after polymerization fluoropolymers have among their endgroups certain types that are designated as unstable. Unstable endgroups may decompose or otherwise react at the temperatures at which the fluoropolymers are melt-processed, that is, they are thermally unstable. They can cause bubbles or voids in the processed fluoropolymer. They may also be a source of hydrogen fluoride in the finished articles of melt-processing, for example by exposure of the articles to atmospheric moisture. That is, they are hydrolytically unstable. Among these unstable endgroups are: —COOH, which can decarboxylate at processing temperatures, generating carbon dioxide, a potential source of bubbles and voids; —COF, which though more thermally stable, hydrolyzes easily to —COOH and HF; and —CF=$CF_2$, which oxidizes to —COF; and —$CONH_2$ which although desirable in certain applications due to its greater thermal stability than —COOH ends and greater hydrolytic stability than —COF ends can react or decompose into —COOH, —COF, or —CF=$CF_2$ groups, often with color formation.

Fluorination is among the ways to reduce the number of unstable endgroups in fluoropolymers that are disclosed. Such fluorination converts the non-perfluorinated unstable end groups to the highly stable perfluorinated end group —$CF_3$. British Patent 1,210,794 describes contacting solid fluoropolymer with fluorine. Because of the solid and gas phase nature of this system, particle size and efficiency of contact between the gas and the solid will affect the time needed to achieve unstable endgroup reduction. Contact times on the order of hours are typical of fluorination of solid polymer.

U.S. Pat. No. 4,626,587 discloses that as-polymerized melt-processible fluoropolymer such as tetrafluoroethylene (TFE)/hexafluoropropylene (HFP) copolymer (FEP), has an additional source of instability, namely relatively unstable linkages in the polymer backbone arising from adjacent HFP units in the polymer backbone. This patent teaches removal of this instability by subjecting the fluoropolymer to high shear in a twin screw extruder, the twin screws preferably containing kneading blocks. The unstable end groups of the fluoropolymer and/or any poor (dark) color present in the fluoropolymer after this high shear treatment are eliminated by an after-treatment of the fluoropolymer, such as fluorination as described in British Patent 1,210,794 or humid heat treatment such as disclosed in U.S. Pat. No. 3,085,083, wherein water (steam) converts —$CF_2$COOH end groups to more stable —$CF_2$H end groups. Fluorination of the extruded cubes of fluoropolymer changes the dark as-extruded color of the cubes to white. U.S. '587 also discloses the addition of 1 wt % water to the twin screw extruder to hydrolyze acid fluoride end groups (paragraph bridging cols. 7 and 8), this amount of water corresponding to a molar excess of 751× with respect to the 37 acid fluoride groups present/$10^6$ carbon atoms when the water was not added.

European Patent Application 0 928 673 A1 (WO98/09784) discloses the removal of unstable end groups, unstable bonds in polymer backbones of fluoropolymers, and poor color from the fluoropolymer by subjecting the fluoropolymer to a melt kneading step. This publication observes that the use of a twin screw extruder in U.S. '587 provides too short a residence time and requires the after-treatment to remove unstable end groups and poor color and overcomes this shortcoming by using a kneader, which has a higher usable volume ratio (usable space/actual space) than a twin screw extruder and carries out the kneading of the molten fluoropolymer using paddles mounted upon a shaft for at least 10 minutes, 40 to 60 min. being used in the Examples in the presence of fluorine. During this melt-kneading, the molten polymer is exposed to reactants which are disclosed to achieve the stabilization and decolorizing effects, such reactants being at least one of the following: fluorine, water or steam, salts or bases or alcohol.

European Patent Publication 1 170 303 A1 criticizes the melt kneading of WO 98/09784 as promoting the depolymerization of the perfluorovinyl end groups and deterioration of the fluoropolymer. EP '303 also criticizes the large size and long time required by a surface renewal type kneader. EP '303 addresses this problem by melt kneading the fluoropolymer in a twin screw extruder equipped with a kneading block in a treatment zone within the extruder for a period of time of 0.2 to 5 min. 2 min. being used in the Examples. Both water and oxygen are the reactants added to the treatment zone, the omission of oxygen giving a poor result as indicated in Comparative Example 1. Preferably a salt, potassium carbonate is exemplified, is also present in the treatment zone. The amount of oxygen present is at least stoichiometric with respect to the perfluorovinyl groups present, preferably an excess amount, disclosing at least 10 moles of oxygen per mole of perfluorovinyl group, and particularly a molar excess of 50 to 500. The molar amount of water present can be the same number of molecules as the unstable end groups to be stabilized, but preferably an excess amount, particularly at least 10× excess amount. To accomplish the stabilization reported in Example 1 with 2 min. of melt kneading at superatmospheric pressure, the molar excess of water and oxygen relative to —COOH ends calculate to 1337× and 198×, respectively. To accomplish the stabilization reported in Example 2 at subatmospheric pressure, the molar excess of water and oxygen calculate to 853× and 79×, respectively. The stabilization goal as reported in Tables 1 and 2 is to convert —COOH end groups to —$CF_2$H.

EP '303 also discloses fluorine treatment of the fluoropolymer after the stabilization treatment of the invention of (p. 5, l. 17–19), i.e. after the stabilized fluoropolymer exits the twin screw extruder. Fluorination provides the end groups of greatest stability, namely —$CF_3$.

More efficient and more effective processing of fluoropolymer to change its character, e.g. to stabilize the fluoropolymer, is needed.

SUMMARY OF THE INVENTION

The present invention provides a more effective and more efficient process for stabilizing melt-processible fluoropolymers as well as for carrying out chemical reactions with fluompolymers in general. One discovery of the present invention is that in the stabilization treatment of molten fluoropolymer with water reactant to form —$CF_2$H end groups, oxygen is not a necessary reactant, and in fact can have an adverse result on fluoropolymer quality, and furthermore that the resultant stabilized fluoropolymer does not discolor during the reaction and therefore does not require subsequent fluorine treatment to remove discoloration. Another discovery of the present invention is that when the desired stabilization effect is the formation of —$CF_3$ end groups, the fluorination can be carried out on molten fluoropolymer in much less time than the minimum of 10 min in EP '673 and can be carried out in a twin screw extruder and not after processing in such extruder as in EP '303.

The process of the present invention can be described as a process for carrying out a chemical reaction with fluoropolymer, comprising (a) melting said fluoropolymer, (b) contacting said molten fluoropolymer with reactant in isolation from said melting, said contacting being carried out in a reaction zone having free volume, and (c) subdividing said molten fluoropolymer in said reaction zone to enable said reactant to effectively contact said molten fluoropolymer so as to carry out the chemical reaction between said reactant and said molten fluoropolymer, (d) devolatilizing the resultant molten fluompolymer in isolation from (b) and (c), and (e) cooling the devolatilized fluoropolymer.

Thus, the process of the present invention is a manipulative process for efficiently and effectively carrying out reactions with fluoropolymer. The formation of —$CF_2H$ and —$CF_3$ end groups are two among many different end groups or reaction results that can be achieved by the process of the present invention, as will be described in greater detail later herein.

DETAILED DESCRIPTION

The zone in which the melting of the fluoropolymer occurs, and the reaction zone in the process of the present invention are separate from one another, enabling the process to be carried out continuously, i.e. as the polymer is melted, it can enter the reaction zone and advance through the reaction zone to process steps (d) and (e). Preferably, the process is carried out in an extruder, such as a twin screw extruder, typically having a relatively low usable volume ratio. In accordance with the present invention, however, the melting of the fluoropolymer occurs in the melting zone of the extruder, and this melting zone is isolated from the reaction zone by the molten fluoropolymer completely filling the usable volume of the extruder. The usable volume of the extruder is the volume of the extruder barrel that is not occupied by the extruder screw within the barrel. Thus, the molten polymer forms a "plug" or "seal" within the extruder barrel, at the transition between the melting zone and the reaction zone. In the reaction zone, however, the usable volume is not completely filled with polymer. Sufficient volume remains, referred to herein as free volume, to enable the reactant to have open space, i.e. space unoccupied by the molten fluoropolymer and screw elements that accomplish the subdividing of the molten fluoropolymer in the reaction zone.

The subdividing of the molten fluoropolymer in the reaction zone rapidly regenerates new surfaces of molten fluoropolymer, making the desired reaction sites available at the surface of the fluoropolymer, thereby minimizing the need for mass transfer to occur in order for the reactant to have access to the reacting site. Thus, the effective contact between reactant and molten fluoropolymer occurring in the reaction zone is that which enables the reaction rate to be primarily governed by the rate of reaction between the reactant and the unstable end group (reacting site) rather than the by the rate of diffusion of the reactant to the end group. This surface regeneration can be achieved by repeatedly subdividing the molten fluoropolymer. The combination of free volume enabling the reactant to circulate within the reaction zone without having to depend on mass transfer to reach reaction sites and subdivided molten fluoropolymer enables this effective contact to occur, wherein the speed of the overall reaction is essentially the rate at which the reaction between the reactant and the reacting site proceeds, i.e. essentially not limited by requirement for mass transfer of the reactant from the surface of the molten fluoropolymer into the interior thereof in order to complete the chemical reaction.

By way of example of the effectiveness of the contact between reactant and molten fluoropolymer in the reaction zone, the instability of the fluoropolymer arising from —COOH end groups is removed without discoloration of the fluoropolymer. Decarboxylation at this unstable site leaves —$CF_2^-$ (fluorocarbon anion) end groups in place of the —COOH end groups. Such anionic structures are extremely unstable in the fluoropolymer melt, and if no reactant is present in the immediate vicinity of the end, it will quickly lose a fluoride anion, causing the formation of unstable —CF=$CF_2$ (perfluorovinyl) end groups. The effective contact between water reactant and the molten fluoropolymer in the reaction zone in accordance with the present invention, converts the —$CF_2^-$ to the more stable —$CF_2H$ end group before the reaction to the perfluorovinyl end group can occur, i.e. avoiding the formation of the unstable perfluorovinyl end groups and avoiding the depolymerization problem associated with such groups. The same (equivalent) effective contact is present in the subdividing step (c) when the end group is other than —COOH and the reactant is other than water, even though different reactions are occurring.

The subdividing of the molten polymer is simultaneous and repetitive. Thus, the molten fluoropolymer is subdivided into a large number of separate streams at one time in the reaction zone and this subdividing is repeated a plurality of times within the reaction zone to expose new surfaces of molten fluoropolymerto the reactant. Kneading blocks subdivide molten polymer into at most three portions for bilobal geometries or five portions for trilobal geometries. The subdividing used in the present invention preferably divides the molten polymer into at least six portions, preferably at least 8 portions, and this subdivision is repeated at least twice within the reaction zone. Such subdivision can be achieved in a twin screw extruder by using gear or turbine type mixing elements positioned along the extrusion screws within the reaction zone. Examples of such mixing elements are the SME, TME, and ZME screw elements that are commercially available from Coperion Corporation, wherein the screw flights contain interruptions in the form of notches around their peripheries, at least 6 interruptions in one rotation of each periphery. The ZME element is described in U.S. Pat. No. 5,318,358 and is depicted as multiple elements in FIG. 4. As shown in FIG. 1, the ZME elements are reverse pumping with respect to the polymer being advanced through the extruder by the extrusion screw. Thus, the ZME elements pump the molten polymer backwards (counterdurrent) towards the feed end of the extruder, while the notches (slots) in the periphery of the elements permit small streams of molten polymer to advance forward through the slots, thus obtaining subdividing of the molten polymer into small portions, at least 10 for each ZME element shown in FIG. 4, which can be used in the present invention. The SME elements resemble the ZME elements but pump the molten polymer forward, while the slots in its periphery cause small streams of molten polymer to be formed in a countercurrent pumping action. The TME elements are neutral with respect to pumping action, i.e. they resemble a gear, whereby the neutral flight of this element tends to hold up flow of molten polymer, while the peripheral slots permit small streams of molten polymer to pass through the TME element. These elements can be used in succession within the reaction zone to accomplish the surface regeneration necessary for reaction with the reactant to occur without undesired side reaction or polymer degradation. Only one of these types of elements need be used in the succession of elements, or combinations thereof can be used. They can be separated by forward pumping conveying elements to provide the desired free volume within the reaction zone. Other types of mixing elements can be used in combination with these elements or in place thereof, such as mixing elements containing pins or studs extending from the extruder screw, which disrupt the flow of molten polymer, thereby exposing new surface of the polymer for reaction with reactant, such as shown in FIGS. 2A, and 2D of U.S. Pat. No. 5,932,159. It is also possible to put the pins or studs in the barrel if a corresponding relief is made in the screw, such as in a Buss Kneader® produced by Coperion Corporation. Another alternative that can be used is cavities or reliefs cut into either/or the screw channel and the extrusion barrel as shown in FIG. 2F of U.S. '159. The interruptions and disruptions of the molten fluoropolymer in the reaction zone represent a subdividing of the fluoropolymer, including the recombining of the molten fluoropolymer, this occurring a plurality of times within the reaction zone, each time exposing new surfaces of molten fluoropolymer making them accessible to the reactant.

The subdividing occurring in the reaction zone is more analogous to distributive mixing than dispersive mixing. In distributive mixing, two or more molten polymers having similar melt viscosities are mixed together using equipment that accomplishes the mixing using relatively low shear. In contrast, equipment used for dispersive mixing subjects molten polymer to high shear to break down polymer agglomerates, such as gel particles. The high shear associated with dispersive mixing has the disadvantage of excessively degrading the molten fluoropolymer, creating unstable end groups and discoloration if too much dispersive mixing is used. U.S. Pat. No. 5,932,159 discloses and depicts a variety of distributive mixing devices and dispersive mixing devices, and describes the use of kneading blocks to accomplish dispersive mixing (col. 3, I. 47–48). While the subdividing carried out in the process of the present invention is like distributive mixing, such subdividing provides a different result, i.e. a regeneration of surface area to minimize the distance required for mass transfer and allow rapid and efficient chemical reaction between the reactant and the molten fluoropolymer, rather than the mere mixing together of different polymers.

Notwithstanding the extensive subdividing of the molten fluoropolymer in the reaction zone and including even the possibility of portions of the molten fluoropolymer repetitively including intervals of countercurrent flow, the reaction zone has free volume within the entire reaction zone or within portions thereof. In an extruder, such as a twin screw extruder, the reaction zone will be a continuation of the melting zone, i.e. the extruder barrel will have the same cross-sectional area in both zones, but the reaction zone will be separated from the melting zone by a melt plug and will contain free volume. The melt plug that separates the zones can be achieved by a number of techniques including, but not limited to, utilizing a reverse pitch element, utilizing an element that restricts polymer flow, reducing the cross-sectional free area, and/or using a diminished pitch element at the end of the melting zone. The creation of free volume downstream from the melt plug and within the reaction zone is normally achieved by increasing the free volume to a volume greater than the volume of the melt in the reaction zone. This can be achieved through several techniques with the most common being to increase the forward pitch of the element, but it can also be achieved by changing the cross-sectional geometry of the screw(s) to increase the free area. Either technique or the combination thereof can be used in the practice of the present invention.

In greater detail, with respect to process step (a), the melting of the fluoropolymer can be carried out either in the same extruder that is used for the reaction or in a separate device. The use of the same extruder for both melting and reaction is usually the most economical and will be exemplified herein. If the melting occurs in the same extruder as the reaction, the melting would normally occur by conventional means by the application of sufficient heat, usually at least 40° C. greater than the melting temperature of the fluoropolymer, and mechanical energy input for sufficient time to cause the fluoropolymer to become molten. Since molten fluoropolymer generally has a high viscosity, it is preferred that the temperature of the melt is at least 30° C. above the melting point of the fluoropolymer. The melting point of the fluoropolymer is the peak of the endotherm obtained using the thermal analyzer in accordance with the procedure of ASTM 3159. When the process is carried out in an extruder, the configuration of the screw or screws, if the extruder is a twin screw extruder, can be conventional to convey the fluoropolymer from the feed end of the extruder towards the reaction zone, while the melting of the fluoropolymer occurs from the input heating and the mechanical energy from the extrusion screw advancing the fluoropolymer through the melting zone. The conveyance of the molten fluoropolymer through the melting zone continues into the reaction zone, whereupon the screw elements present in the reaction zone, while accomplishing the subdividing described above, continue the conveyance of the molten fluoropolymer through the reaction zone and towards the outlet of the extruder.

With respect to process step (b) the contacting of the molten fluoropolymer with reactant occurs preferably by feeding the reactant into the reaction zone independently of the feed of the molten fluoropolymer into the reaction zone. This, together with the isolation of the reaction zone from the melting zone, enables the amount of reactant to be controlled and isolated from the feed end of the processing equipment. Depending on the particular reactant used, this isolation is also important for safety reasons, by preventing the reactant from leaking from the reaction zone to the feed end of the processing equipment, and then to the atmosphere, unless the feed end of the processing equipment is kept isolated from the atmosphere.

The feed of the reactant or reactants can come from a single or multiple inlet ports into the reaction zone and the reactant is preferably in the form of a fluid, which at reaction temperature, i.e. the temperature of the molten fluoropolymer, can be at, above, or below the critical temperature of the reactant, and can be a gas or a liquid or a solid that decomposes to a gas. The temperature of the reaction zone, which will be at least the temperature of the molten polymer entering the reaction zone from the melting zone, can, but does not have to, cause the reactant to change phase (vaporize or melt) or to chemically change (decompose). The process of the present invention has a number of preferred conditions, which can be used separately or together depending on the particular reactant being used. For example, while oxygen can be a reactant to convert carbon contaminant in the fluoropolymer to $CO_2$ to improve color, oxygen is not a necessary reactant in the conversion of —COOH end groups to the more stable —$CF_2H$. A proton (hydrogen) source, such as water, is an essential reactant to form the more stable hydride end group. Large excesses of reagents orders of magnitude above the stoichiometric level such as the water as used in EP '303 are indicative of a process with either mass transfer or kinetic limitations. The large excess of water has several disadvantages including leading to excessive corrosion and generation of liquid waste. Even with the excessive water, the reaction is still not efficient enough to convert the fluorocarbon anion that results from decarboxylation directly to the stable hydride. Instead, many of the fluorocarbon ions lose a fluoride anion to form the —CF=$CF_2$ (perfluorovinyl) end group. To eliminate the —CF=$CF_2$ end groups, oxygen has to be added to convert the perfluorovinyl end groups to acid fluoride —COF end groups, which in turn react with the water reactant to form —COOH groups, which continue to react through the above cycle with only a portion of the ends reacting with the water to form the stable hydride end groups in any cycle. Thus, poor efficiency of contact between the polymer end groups and water promotes cycling of the endgroup reactions through multiple formations of the starting —COOH end group, and requires oxygen being an essential reactant to convert the perfluorovinyl end group to —COF, so as to be convertible back to —COOH. A large enough excess amount of water reactant eventually succeeds in converting most of the —COOH (the —COOH is decarboxylated), initially present, and interimly formed, to —$CF_2H$. The requirement for oxygen reactant in the process of EP '303 indicates the formation of carbon, being caused by polymer degradation and by depolymerization of unstable perfluorovinyl end groups, the formation of the latter being an indicator of insufficient contact between water reactant and molten polymer, whereby the conversion of fluorocarbon anion to perfluorovinyl end groups occurs before hydride end-capping to form —$CF_2H$, by virtue of the delay caused by the need for mass transfer for the water reactant to reach the decarboxylation reaction site.

The much greater efficiency of contact between reactant and molten fluoropolymer in the present invention enables the hydride endcapping to be carried out without feeding oxygen into the reaction zone as a reactant separate from the feed of the fluoropolymer into the treatment zone in EP '303. Oxygen does not have to be excluded from the reaction zone however, in the water/—COOH reaction system, which means that the fluoropolymer feed to the processing equipment, such feed generally being in the form of flakes, does not have to be deoxygenated to rid the surface of the flakes of absorbed oxygen. Even this small amount of absorbed oxygen is mostly flushed out of the molten fluoropolymer, back towards the feed end of the extruder, by the melting process, whereby the amount of oxygen, if any, reaching the reaction zone is much less in molar amount than the moles of —COOH end groups present. Thus, the absence of any feed of oxygen into the reaction zone separate from the feed of fluoropolymer into the reaction zone is considered as carrying out the reaction essentially free of oxygen. Because of the ability to rapidly regenerate surface area and eliminate mass transfer limitations, the reaction can quickly and completely proceed with a molar amount of reactant that is less than 10×, preferably less than 5×, with respect to the molar amount of the reactive moiety in the molten fluoropolymer, either end groups or contaminant present in the fluoropolymer, or both. In the reaction involving water and —COOH end groups, it is even possible to use fewer moles of reactant than moles of —COOH end groups present to obtain replacement of the —COOH end groups by —$CF_2H$ end groups, by virtue of small amounts of hydrogen being available from the hydrogen of the —COOH end groups. As stated above, in the case of the water/—COOH reaction system (—COOH end groups on the molten fluoropolymer), the excess of water should be such as to cause formation of hydride end groups, whereby oxygen does not have to be added to the reaction zone. Excellent results are obtained even when the molar amount of water reactant is less than the moles of —COOH end groups present in the polymer. The possible presence of oxygen absorbed on the surface of the fluoropolymer flakes fed to the processing equipment is not addition of oxygen to the reaction zone in the sense that the step of addition is an action that is independent of the feeding of the flake to the processing equipment.

A wide variety of reactions involving the molten fluoropolymer are contemplated by the present invention, such as follows:

(i) the end groups are acid end groups, —COF or —COOH and the reactant is ammonia, to form the more stable amide end group —$CONH_2$;

(ii) the end groups are acid end groups, —COF or —COOH, and the reactant is a primary or secondary amine, such as dimethyl, diethyl or propyl amine, to form amide end groups —CONRH or —$CONR_2$, wherein R is the alkyl group(s) of the amine, where for $R_2$, the alkyl groups are the same or different;

(iii) the end groups are acid end groups, —COF or —COOH and the reactant contains an alcohol, such as methanol, ethanol, propanol, or a fluorine containing alcohol to form the more stable ester —COR' where R' is the alkyl group supplied by the alcohol;

(iv) the reactant contains fluorine to convert such end groups as —COOH, amide, hydride, —COF, and other nonperfluorinated end groups or perfluorovinyl to —$CF_3$ end groups;

(v) The reactant contains an oxygen or fluorine to convert oxidizable contaminant to a gaseous compound, e.g. carbon, to $CO_2$ or $CF_4$; and (vi) the end groups acid end groups, —COF or —COOH, or carboxylate salt end groups, preferably alkali metal carboxylate salt, and the reactant is a proton source to form the more stable —$CF_2H$ end group.

With respect to reactions (iv) and (v), the fluorine can be in the form of fluorine gas, which may be diluted with nitrogen, argon, helium, krypton, neon, xenon, carbon dioxide, or other inert gas or can be in the form of a fluorinating agent such as any of the fluoride compounds disclosed in British Patent 1,210,794, which supply fluorine under reaction conditions. The oxygen reactant used in reaction (v) can be in the form of oxygen gas, in neat or diluted form, or can be in the form of an oxidizing agent such as, but not limited to, peroxides, cholorates, perchlorates, nitrates, and permanganates, which make oxygen available during the reaction. With respect to reaction (vi), the proton source is hydrogen, which is in the form of $H^+$, to react with the —$CF_2^-$ remaining after decarboxylation. This proton source as the reactant is described herein primarily as water because of water being the most economical source for the proton under the conditions of the reaction. The water can be added to the reaction zone as a liquid, whereupon it will instantly become steam, or may be added as steam to the reaction zone. Wherever water is disclosed as the reactant, such water can also be considered as the proton source.

These reactions, (i)–(iv) and (vi), are not limited to the starting end groups specified. Where a plurality of end groups are specified they all may be present or other non-specified end groups may also be present.

With respect to process step (c), the subdividing occurring therein is described above. With respect to the reaction time, which is the residence time of the molten fluoropolymer in the reaction zone, the reaction can be carried out essentially to completion in no more than 5 minutes, preferably no more than 120 seconds, and more preferably no more than 60 seconds. The residence time in the reaction zone according to this invention is determined as follows: The ZME elements are considered to be fully filled with polymer and the residence time, $\Theta$, in the ZME elements is $\Theta=V/q$, where V is the useable volume of the element and q us the volumetric throughput rate. For the conveying bushings, which are not fully filled, $\Theta=2L/ZN$, where L is the length of the reaction zone that contains the bushings, Z is the pitch (the axial distance required for a single rotation of the screw), and N is the screw speed. The residence times for the ZME elements and the bushings are summed to obtain the total residence time in the reaction zone. The 1 mm spacers are ignored. They comprise only about 1% of the length of the reaction zone in the Examples disclosed herein.

The combination of short reaction time and subdividing such as by the distributive type of mixing of the molten fluoropolymer in the reaction zone enables the reaction to be completed in a short time without causing undesirable side reactions, such as occurs upon subjecting the melt to high shear as in the dispersion type mixing or upon prolonged exposure of the melt to the high melt temperatures. Fluoropolymer processed according to the present invention has excellent color with a whiteness index normally above 60. In U.S. '587, polymer color is measured by the reflectance of green light, a high %G indicating a high level of whiteness. The whiteness index, described in detail before the Examples, provides an improved determination of whiteness. For example, the whiteness index of at least 60 for FEP processed by reaction (vi) above is as good a white color as the %G values reported in Table IV of U.S. '587 after fluorination of the polymer.

The reaction temperature in the reaction zone will typically be no more than 400° C. and at least 30° C. greater than the melting point of the fluoropolymer, typically at least 300° C., applicable to lower melting fluompolymers such as ethylene/tetrafluoroethylene copolymer.

With respect to steps (d) and (e), to remove the volatile products of reaction, any unreacted reagents, and any inerts, one or more removal ports are provided. In extruders, these are known as vacuum ports or vent ports, positioned at the end of the reaction zone. A melt seal is preferably provided between the reaction zone and the removal port to isolate the devolatilization from the reaction zone. Such melt seal can be provided by known means. When the reaction is carried out in an extruder, the extruder screw element(s) creating the melt seal (plug) can either be reverse pumping, of diminished forward pitch, or possessing increased screw volume so as to accomplish the seal. Prior to the removal port, an inert gas or gases may be added to the molten polymer to facilitate removal of unreacted reagents or reaction products. This is a process known as stripping that is widely reported in the art.

With respect to process step (e), the molten fluoropolymer is often passed through a melt filter and then a die to achieve the final desired shape. Depending on the pressure drop through these operations, the process might employ an additional pump that could take the form of another extruder (normally a single-screw extruder), a gear pump, or other pumping device. The die can be designed to produce a finished or semifinished product. Some examples include film, profiles, tubes, wire coatings, fibers, and other objects. The die can also be designed to produce pellets or cubes. The later is achieved by either extruding a strand and chopping it or melt cutting. Once the product leaves the die, it is rapidly cooled to form a solid that maintains the desired shape.

Additionally, it is preferred that the fluoropolymer after cooling be sparged so as to remove decomposition products, if any, that remain in the fluoropolymer upon solidification. Sparging is normally accomplished by passing a gas (air and nitrogen are the most common gases) around the extruded product. The gas can be at ambient conditions or heated to a temperature at least 10° C. below the melt point. Higher temperatures tend to allow shorter sparge time. The normal range of sparge temperatures are between 25° C. and 250° C. with sparge times of between one hour and twenty-four hours, but the exact conditions can be varied to insure adequate removal of dissolved gases.

One group of fluoropolymers used in the process of this invention are characterized by having at least about 90%, preferably at least about 95%, and more preferably all of the monovalent atoms as halogens, preferably as fluorine. That is, the polymers are preferably perhalogenated, more preferably perfluorinated. The polymers may be crystalline or amorphous. By crystalline is meant that the polymers have some crystallinity and are characterized by a detectable melting point measured according to ASTM D 3418, and a melting endotherm of at least about 3 J/g. Melt-processible polymers that are not crystalline according to the preceding definition are amorphous. Amorphous polymers include elastomers, which are distinguished by having a glass transition temperature of less than about 20° C. as measured according to ASTM D 3418. By the term "melt-processible" it is meant that the polymer can be processed (i.e., fabricated into shaped articles such as films, fibers, tubes, wire coatings and the like) by conventional melt processing means. Such processibility requires that the melt viscosity at the processing temperature be no more than $10^6$ Pa·s. Preferably it is in the of $10^2$ to $10^6$ Pa·s, and most preferably $10^4$ to $10^6$ Pa·s. Another group of melt-processible fluoropolymers that can be used in the process of the present invention are those that contain hydrocarbon groups in the polymer chain, with the fluoropolymer nevertheless containing at least 35 wt % fluorine.

Melt viscosities of the melt-processible polymers were measured according to ASTM D 1238-52T, modified as follows: The cylinder, orifice and piston tip are made of a corrosion-resistant alloy, Haynes Stellite 19, made by Haynes Stellite Co. The 5.0 g sample is charged to the 9.53 mm (0.375 inch) inside diameter cylinder, which is maintained at 372° C.±1° C., such as disclosed in ASTM D 2116 and ASTM D 3307 for perfluorinated polymers. Five minutes after the sample is charged to the cylinder, it is extruded through a 2.10 mm (0.0825 inch) diameter, 8.00 mm (0.315 inch) long square-edge orifice under a load (piston plus weight) of 5000 grams. This corresponds to a shear stress of 44.8 kPa (6.5 pounds per square inch). The melt viscosity in Pa·s is calculated as 53170 divided by the observed extrusion rate in grams per 10 minute. The melt viscosity of fluoropolymers containing hydrocarbon groups in the polymer chain can be determined in accordance with ASTM procedures for these particular polymers, such as ASTM D 3159 and ASTM D 5575.

Examples of melt processible polymers used in this invention are polychlorotrifluoroethylene and copolymers of tetrafluomethylene (TFE), with one or more of comonomers such as hexafluoropropylene (HFP), perfluoro(alkyl vinyl ether) (PAVE), and perfluorodimethyl dioxole (PDD). TFE/HFP copolymers are commonly known as FEP. TFE/PAVE copolymers are commonly known as PFA or MFA. PAVE include perfluoro(alkyl vinyl ether), wherein the alkyl group contains from 1–8 carbon atoms, preferably 1 to 3 carbon atoms, such as perfluoro(propyl vinyl ether (PPVE), perfluoro(ethyl vinyl ether) (PEVE), and perfluom(methyl vinyl ether) (PMVE) or mixtures thereof. An additional example of perfluoropolymer are the elastomers as tetrafluoroethylene/vinylidene fluoride copolymer, optionally containing hexafluoropropylene, and tetrafluoroethylenelperfluoro(alkyl vinyl ether) copolymers, alkyl being defined as above. Examples of fluoropolymers containing hydrocarbon groups in the polymer chain are copolymers of tetrafluoroethylene or chlorotrifluoroethylene with ethylene and copolymers of tetrafluoroethylene/hexafluoropropylene/inylidene fluoride, known as THV. The copolymers described above can include one or more additional comonomers in small amounts to improve the properties of the fluoropolymer. Endgroups are measured by the measured by the methods described in U.S. Pat. Nos. 3,085,083 and 4,675,380.

Reaction process (vi) carried out with FEP, not only stabilizes the polymer backbone, by ridding the polymer of HFP diads and triads (adjacent HFP units), but also stabilizes the end groups by converting them to —$CF_2H$ end groups, with subsequent fluorination being unnecessary to improve polymer color. The ridding of HFP diads and triads is primarily a rearrangement of atoms, rather than formation of new end groups, as indicated by little change in molecular weight occurring in the backbone stabilization process. The FEP reacted with water in accordance with the present process provides an FEP which has excellent color as indicated by a whiteness index of at least 60 and which is backbone stabilized. The process of the present invention does not promote degradation of the FEP polymer while the backbone stabilization is occurring. After sparging, such as by heating in an air oven for twelve hours at 150° C., to remove dissolved gases, the FEP exhibits a backbone volatiles index of less than 22 and a total volatiles index of less than 30, indicating stabilization of the polymer backbone as well as the end groups. Except for this backbone stabilization of FEP and reaction (v) above, the process of the present invention is generally directed at the most reactive moieties present in the normally non-reactive, chemically inert fluoropolymers, namely the end groups of the fluoropolymer. Thus, the composition of the fluoropolymer itself, i.e. excluding end groups is generally unimportant as not participating on the reaction. Preferably, the fluorine treatment of reaction (iv) is carried out on perfluorinated polymers that contain unstable end groups, so that the reaction occurs primarily with these end groups.

Volatiles index is a measure of the stability of the fluoropolymer by subjecting the fluoropolymer to heating at a high temperature for a certain period of time and determining the bubble formation occurring as a result of such heating. The procedure of determining volatiles index as reported herein is similar to the method disclosed in U.S. Pat. No. 4,626,587, except that the pre-heat treatment is not used, the polymer sample size is 18.5 g, the volume of the apparatus is 124 ml, the temperature of heating of the polymer is 360° C., and the equation used is:

Backbone volatiles index=$P40-P10$

Total volatiles index=$P40-P0$ wherein P0, P10 and P40 are the pressures of the sample in mm Hg after 0, 10 and 40 minutes in the hot block. The pressure of the volatiles released (bubble formation) from the polymer at 10 min and at 40 min heating time is compared to obtain the backbone volatiles index. The total volatiles index is calculated in the same fashion as the backbone volatiles index, but it uses the pressure of the volatiles released from the polymer at 0 min and at 40 min heating time. So that the determination of volatiles index is not skewed by the presence of dissolved gases present in the fluoropolymer after practice of the process of the present invention, the fluoropolymer is subjected to either a commercial sparging process as described above, or in the case of laboratory samples, the following heat treatment prior to the determination of volatiles index: the fluompolymer is heated (sparged) in an air oven at 150° C. for 12 hours. The total volatiles index of fluoropolymers processed in accordance with the present invention is no greater than 30. The backborie volatiles index is no greater than 22. This backbone volatiles index of 22 is comparable to the value of 10 quoted in U.S. Pat. No. 4,626,587 as being the limit for bubble free product after adjusting for the differences in test equipment and test conditions.

The whiteness index is determined by using a Hunterlab Tristimulus Colorimeter, Model D25M-9 in accordance with the instructions provided with the Colorimeter. The determination involves filling the optically clear cylindrical sample holder (6.35 cm inner diameter) with cubes of the polymer, exposing the sample holder to white light (light source provided with the Colorimeter) circumferentially, and measuring the reflected light using four silicon diode detectors. Preceding this determination, the Colorimeter is calibrated using a standard whiteness plague supplied by the Colorimeter manufacturer.

The whiteness index of at least 60 achieved by subjecting FEP to reaction (vi) is also preferably achieved by each of the other reactions on each of the other fluoropolymers. The process of the present invention does not cause color formation by polymer degradation. The volatiles index and whiteness index can vary independently. Thus, the fluoropolymer can have a low volatiles index and exhibit poor color, well below the desired minimum whiteness index of 60.

EXAMPLES

The whiteness index values and volatiles index values reported in the experiments below are determined as described above. The volatiles index is determined after the polymer has been sparged at the specific conditions mentioned above so that the dissolved volatiles do not mask the stabilization of the polymer measured by exposure to much higher temperatures.

All of the experiments are carried out with a 57 mm twin-screw extruder, equipped with an injection probe, which is a rod having a longitudinal bore opening flush with the surface of the extruder barrel in the reaction zone, and a vacuum port connected to a fluorine/hydrofluoric acid scrubbing system, which feeds into a 120 mm single-screw extruder, which is equipped with a die. The twin-screw extruder serves as a resin melter and end group reactor in which the desired end group, and in the case of FEP backbone, stabilization is conducted. The single-screw extruder serves as a melt pump to generate the pressure necessary to move the resin through the optional screen pack and die.

The extrusion equipment described above is a "Kombiplast" extruder from the Coperion Corporation. Corrosion-resistant materials are used for those parts that come into contact with the polymer melt and fluorinating agent. The twin-screw extruder has two corotating screws disposed side by side. The screw configurations are designed with an intermeshing profile and tight clearances, causing them to be self-wiping. The screw configurations include kneading blocks, mixing elements, and conveying screw bushings. The first 15 Length/Diameter (L/D, D being the diameter of the bushings) of the extruder is the melting zone. This contains the feeding, solids conveying, and kneading block sections. The kneading block sections provide high shear and insure proper melting of the polymer. The melting section ends with a left handed bushing (rearward pumping) that forms a melt seal and insures complete fill of the final kneading blocks.

The reagent is injected immediately after this section. The next 11 L/D contain the injection, mixing and reaction sections with multiple mixing elements and constitute the reaction zone of the extruder. The mixing elements used and their arrangement is as follows: two ZME elements, two 40 mm conveying bushings (40 mm is both the length of the element and the pitch of the helical flight in one revolution of the element), a single ZME element, two 40 mm conveying bushings, two ZME, two 40 mm conveying bushings, and a left handed bushing to provide a melt seal with respect to the devolatilization zone. A 1 mm thick spacer ring is present between conveying bushings and ZME elements. The next 5 L/D contains the vacuum extraction section (devolatilization zone), which is connected to a scrubbing system designed to neutralize $F_2$, HF, and other reaction products, depending on the reaction being carried out. The final 2 L/D are used to provide a vacuum seal and pump the molten polymer into the single-screw extruder. End group reactions mainly occur in the section between the injection nozzle and the vacuum port that contains the mixing sections. Backbone stabilization in the case of FEP occurs in both the kneading block sections and the mixing sections. Surprisingly this backbone stabilization, beginning as early as the melting zone is not accompanied by discoloration of the FEP.

The twin-screw extruder empties into a single-screw melt pump, which is designed to generate pressure at low shear rates for filtration and pellet formation. The extruded melt is melt cut through a die with 250 2.5 mm die holes. The pellets are cooled by a stream of water.

The twin-screw extruder is operated with barrel temperatures of 380° C. The single-screw extruder is operated with barrel temperatures of 350° C.

Example 1 (No Reaction)

A compacted flake of a copolymer of tetrafluoroethylene (TFE) and 3.7 weight percent perfluoro(propyl vinyl ether) (PPVE) commonly known as PFA polymerized with ammonium persulfate (APS) initiator is used as the feed material. The polymer has an initial melt flow rate (MFR) of 14.0. The polymer end groups consist of 459 end groups having carbon-hydrogen bonds, divided approximately equally between —$CF_2H$ and —$CF_2CH_2CH_3$ end groups; 180 —COOH end groups, 0 —COF end groups, and 19 —$CONH_2$ end groups. The ethyl end groups come from the use of ethane chain transfer agent in the copolymerization process producing the copolymer. With other chain transfer agents, the end groups would be different and characteristic. For example, with methane, the end group is —$CF_2$—$CH_3$.

The flake is processed through the above extrusion equipment and no reagents are injected into the extruder. The screw speed is adjusted to obtain a residence time of 33 seconds in the reaction zone.

The extruded pellets have a MFR of 14.1. The polymer end groups consist of 377 end groups having carbon-hydrogen bonds, divided approximately equally between —$CF_2H$ and —$CF_2CH_2CH_3$ end groups, 68 —COOH end groups, 38 —COF end groups, and 20 —$CONH_2$ end groups. The backbone volatiles index is 8.7 and the total volatiles index is 18.7 and the whiteness index is 58.38.

Example 2 (The Invention)

The same compacted flake feed as Example 1 is processed through the above extrusion equipment and a fluorination agent consisting of 10 mole % $F_2$ in $N_2$ is injected into the extruder. The ratio of fluorine to polymer is 2500 ppm by weight (1.5× molar excess with respect to all the moles of the non-perfluorinated end groups). The screw speed is adjusted to obtain a residence time of 33 seconds in the reaction zone. The extruded pellets have a MFR of 15.1. The polymer end groups consist of 0 —$CF_2H$ end groups, 0 —$CF_2CH_2CH_3$ ends, 0 —COOH end groups, 0 —COF end groups, and 0 —$CONH_2$ end groups. The backbone volatiles index is 1.9, the total volatiles index is 11.0 and the whiteness index is 76.89.

Example 3 (No Reaction)

A compacted flake of a copolymer of tetrafluoroethylene (TFE), with 11.6 weight percent hexafluoropropylene (HFP), and 1.3 weight percent perfluoro(ethyl vinyl ether) (PEVE) commonly known as FEP polymerized with a mixed ammonium/potassium persulfate (APS/KPS) initiator is used as the feed material. The polymer has an initial melt flow rate (MFR) of 21.9. The polymer end groups consist of 0 —$CF_2H$ end groups, 599 —COOH end groups, 0 —COF end groups, and 0 —$CONH_2$ end groups.

The flake is processed through the above extrusion equipment and no reagents are injected into the extruder. The screw speed is adjusted to obtain a residence time of 30 seconds in the reaction zone.

The extruded pellets have a MFR of 23.9. The polymer end groups consist of 546 —$CF_2H$ end groups, 0 —COOH end groups, 1 —COF end groups, and 6 —$CONH_2$ end groups. The backbone volatiles index is 12.6, the total volatiles index is 21.4, and the whiteness index is 14.70, which is extremely poor. The processing of the FEP with a salt such as the residue from the potassium persulfate initiator (from the copolymerization process) in the extruder causes the shift from —COOH end groups to —$CF_2H$ end groups, but the chemistry is accompanied by formation of carbon as indicated by its poor color. Thus the decarboxylation of the —COOH end groups is accompanied by other reactions, including the formation of —CF=$CF_2$ end groups, which are known to decompose to produce elemental carbon (and $CF_4$) upon further exposure to heat.

Example 4 (The Invention)

The same compacted flake feed as Example 3 is processed through the above extrusion equipment and 145 ppm by weight $H_2O$ as steam is injected into the extruder (0.7× the moles of —COOH end groups). The screw speed is adjusted to obtain a residence time of 30 seconds in the reaction zone.

The extruded pellets have a MFR of 24.2. The polymer end groups consist of 511 —$CF_2H$ end groups, 0 —COOH end groups, 0 —COF end groups, and 16 —CONH₂ end groups. The backbone volatiles index is 12.9 and the total volatiles index is 22.9. Color is good, i.e. the whiteness index is 63.88. The presence of the small amount of water reactant together with the effective contact between the molten FEP and the water in the reaction zone directs the decarboxylation reaction to produce the stable hydride end groups without the accompanying reactions which cause discoloration of the polymer.

Example 5 (Comparison with Example 4)

The same compacted flake feed as Example 3 is processed through the above extrusion equipment and 125 ppm by weight H₂O (0.6× the moles of —COOH end groups) and 2288 ppm by weight air (536 ppm oxygen or 1.2× the moles of —COOH end groups) is injected into the extruder. The screw speed is adjusted to obtain a residence time of 30 seconds in the reaction zone.

The extruded pellets have a MFR of 25.9. The polymer end groups consist of 0 —CF₂H end groups, 50 —COOH end groups, 209 —COF end groups, and 0 —CONH₂ end groups. The backbone volatiles index is 24.8 and the total volatiles index is 52.0 and color is poor; the whiteness index is 26.83. The addition of the oxygen reactant to the reaction zone interfered with the hydride end capping desired from the water reactant, giving both poor volatiles index and color.

Example 6 (The Invention)

The same compacted flake feed as Example 1 is processed through the above extrusion equipment and ammonia gas (NH₃) is injected into the extruder. The ratio of ammonia to polymer is 982 ppm by weight (2× the moles of —COOH end groups). The screw speed is adjusted to obtain a residence time of 33 seconds in the reaction zone.

The polymer end groups are primarily —CONH₂ end groups. Similar results are achieved when the ammonia gas is replaced by an equivalent amount if dimethylamine, and the resulting end groups are primarily —ON(CH₃)₂.

Example 7 (The Invention)

The same compacted flake feed as Example 1 except with COF end groups resulting from polymerization in a non-aqueous media with a peroxide initiator is processed through the above extrusion equipment and liquid Zonyl® BA is injected into the extruder. Zonyl® BA has the formula:

Where R" is

1–2% C₄F₉
27–34% C₆F₁₃
29–34% C₈F₁₇
17–21% C₁₀F₂₁
6–9% C₁₂F₂₅
2–5% C₁₄F₂₉
1–2% C₁₆F₃₃, all %s being by weight The ratio of Zonyl® BA to polymer is 24,000 ppm by weight (2× the moles of —COF end groups). The screw speed is adjusted to obtain a residence time of 33 seconds in the reaction zone.

The polymer end groups primarily consist of —COR" end groups with a similar ratio of R" as the Zonyl® BA.

Example 8 (The Invention)

Scrap film of a copolymer of tetrafluoroethylene (TFE) and 3.7 weight percent perfluoro(propyl vinyl ether) (PPVE) commonly known as PFA is extruded to form cubes. The cubes have extremely poor color (WI of 0.8). The cubes are processed through the above extrusion equipment and a fluorination agent consisting of 10 mole % F₂ in N₂ is injected into the extruder. The ratio of fluorine to polymer is 3000 ppm by weight. The screw speed is adjusted to obtain a residence time of 33 seconds in the reaction zone. The extruded pellets have good color with a whiteness index of 62.

This experiment is repeated except that air instead of fluorinating agent is injected into the reaction zone of the extruder. The ratio of air to polymer is 10% (100,000 ppm) by weight. The screw speed is adjusted to obtain a residence time of 33 seconds in the reaction zone. The extruded pellets have good color with a whiteness index of 60.

What is claimed is:

1. Process for carrying out a chemical reaction with fluoropolymer or with a contaminant in a fluoropolymer, comprising
    (a) melting said fluoropolymer,
    (b) contacting said molten fluoropolymer with reactant in isolation from said melting, said contacting being carried out in a reaction zone having free volume,
    (c) subdividing molten fluoropolymer in said reaction zone to enable said reactant to effectively contact said molten fluoropolymer so as to carry out the chemical reaction between said reactant and said molten fluoropolymer,
    (d) devolatilizing the resultant molten fluoropolymer in isolation from (b) and (c), and
    (e) cooling the devolatilized fluoropolymer.
2. The process of claim 1 and additionally sparging said devolatilized fluoropolymer.
3. The process of claim 1 wherein said molten fluompolymer of step (a) contains acid end groups or carboxylate salt end groups and said reactant contains a proton source, said reaction being between said proton source and said end groups to form stable hydride end groups (—CF₂H) on said molten fluoropolymer in step (c).
4. The process of claim 3 wherein said reactant is water.
5. The process of claim 3 where said reaction zone is free of added oxygen.
6. The process of claim 1 wherein said molten fluoropolymer of step (a) contains non-perfluorinated end groups and said reactant contains fluorine, said reaction being between said fluorine and said end groups to form stable fluoromethyl groups (—CF₃).
7. The process of claim 1 wherein said molten fluoropolymer of step (a) contains acid end groups and said reactant contains an amine to form amide end groups.
8. The process of claim 1 wherein said molten fluoropolymer of step (a) contains acid end groups and said reactant contains ammonia to form —CONH₂ end groups.
9. The process of claim 1 wherein said molten fluoropolymer of step (a) contains acid end groups and said reactant contains an alcohol, to form ester end groups.
10. The process of claim 1 wherein said molten fluoropolymer of step (a) contains contaminant and said reactant converts said contaminant to a volatile form.
11. The process of claim 1 wherein the said reactant contains fluorine.
12. The process of claim 1 wherein the said reactant is elemental fluorine.

13. The process of claim 1 wherein the said reactant contains oxygen.

14. The process of claim 1 wherein said subdividing includes countercurrent flow of streams of said molten fluoropolymer in said reaction zone.

15. The process of claim 1 wherein said subdividing includes dividing said molten fluoropolymer in said reaction zone into at least 6 streams of molten fluoropolymer a plurality of times within said reaction zone.

16. The process of claim 1 wherein said subdividing is equivalent to said fluoropolymer containing —COOH end groups and said reactant being water to obtain stable —CF$_2$H end groups without degrading said fluoropolymer.

17. The process of claim 16 wherein the resultant fluoropolymer has a whiteness index of at least 60.

18. The process of claim 16 wherein said fluoropolymer is tetrafluoroethylene/hexafluoropropylene copolymer and sparging said copolymer to obtain said copolymer having a backbone volatiles index of no greater than 30.

19. The process of claim 1 when said subdividing is characteristic of dispersive mixing.

* * * * *